United States Patent [19]

Carr, Jr.

[11] Patent Number: 4,470,090
[45] Date of Patent: Sep. 4, 1984

[54] SUPERCONDUCTING INDUCTION APPARATUS

[75] Inventor: Walter J. Carr, Jr., Wilkins Township, Allegheny County, Pa.

[73] Assignee: Westinghouse Electric Corp., Pittsburgh, Pa.

[21] Appl. No.: 36,950

[22] Filed: May 7, 1979

[51] Int. Cl.³ .............................................. H02H 9/02
[52] U.S. Cl. .................................... 361/19; 361/141
[58] Field of Search ................................ 361/19, 141; 336/DIG. 1; 335/216

[56] References Cited

U.S. PATENT DOCUMENTS

| | | | |
|---|---|---|---|
| 3,443,255 | 5/1969 | Massar | 336/58 |
| 3,818,396 | 6/1974 | Raphael | 335/216 |
| 4,032,959 | 6/1977 | Boom et al. | 323/44 F |

FOREIGN PATENT DOCUMENTS 1230579  5/1971  United Kingdom ................. 361/19

OTHER PUBLICATIONS

"Feasibility of a Power Transformer with Superconducting Windings", Proc. IEEE, vol. 117, No. 1, 1/1970, pp. 131–140.

Primary Examiner—Harry E. Moose, Jr.
Attorney, Agent, or Firm—D. R. Lackey

[57] ABSTRACT

A winding for superconducting inductive apparatus having one or more sets of main and auxiliary superconducting windings connected in parallel, with the auxiliary winding being disposed in a field-free region of the main winding. The main and auxiliary windings are arranged such that the main winding carries substantially all of the normal operating current of the apparatus and the auxiliary winding, which is located in a field-free region, carries overload currents of the apparatus. The volume of the main windings may thus be reduced, reducing the hysteresis and eddy current losses of the apparatus during normal operation, while incorporating a built-in safety factor to withstand excessive overloads.

8 Claims, 6 Drawing Figures

SUPERCONDUCTING INDUCTION APPARATUS

BACKGROUND OF THE INVENTION

1. Field of the Invention

The invention relates in general to superconducting induction apparatus, and in particular to means for reducing the operational losses in superconducting windings.

2. Description of the Prior Art

Applications for superconducting windings have been limited because of their AC losses and because of their intolerance to transients. These transients may correspond to variations in the magnetic field the superconducting winding is operating in, or they may be variations in the current it carries. Power distribution systems are particularly vulnerable to fault or short-circuit transient currents.

An inherent characteristic of superconducting wire is that at some critical value of current density and/or magnetic field, the superconducting wire will go normal, i.e., become resistant. If a superconducting winding is allowed to go normal, such as due to a current or field transient which exceeds a critical value, a large amount of heat will be generated. The heat generated may cause the cryogenic fluid cooling the superconductor to evaporate at an explosive rate and/or burn out the coil. Further, the work which must be done on the cryogenic fluid to remove the heat generated in the superconductor is on the order of 500 times the actual amount of energy to be removed from the system.

Thus, on the one hand the system should be small enough to keep operational losses to a minimum, and on the other hand it should be large enough to ensure there will be sufficient capacity to minimize the above-mentioned undesirable consequences when the system is subjected to a typical fault current or other transient.

Copper cladding of the individual filaments has been employed in the prior art to stabilize the superconducting wire against normalization of small regions due to temperature fluctuations, by providing an additional path for the current when the superconducting critical current density is exceeded and the superconductor starts to go normal. This allows the current to flow in the copper layer during a short period of time until the wire is again cooled below the critical point.

For large current transients, the technique employed in the prior art is to design the superconducting winding with the capacity to carry a typical fault current, i.e., size the superconducting wire approximately 10 times that which is necessary to carry the normal operating currents. However, the hysteresis loss in a superconducting wire that is subject to a time varying magnetic field is proportional to its volume under typical conditions of interest here. A modern large transformer is highly efficient, and the resistive losses of the windings are considerably under ½% of the total power transferred. Thus, there would be no advantage in reducing the resistive losses associated with windings of a conventional transformer, and replacing them with AC losses, i.e., hysteresis losses of a superconducting winding.

To reduce the amount of superconductor material in a winding which will still carry a fault current it is known to connect a copper auxiliary winding in parallel with a superconducting winding. In fact, copper cladding of the superconducting wire, referred to above, is a form of an auxiliary copper winding, i.e., it is an additional path to transfer current from a superconducting winding. However, this method, like the usual all-superconducting winding, has detrimental aspects which offset the possible benefits. Copper windings are bulky. The current density capability of a superconducting winding is one thousand to ten thousand times the current density capability of a copper winding. Since it is the auxiliary winding which must be sized to carry a fault current on the order of ten times the rated current, the copper auxiliary winding then would have almost the same physical size as a traditional copper winding of the standard power transformer. The potential size and weight reduction of the superconducting winding would be lost. Another detrimental effect of the copper auxiliary is that now the transformer system will experience resistive losses whenever there is current flow in the auxiliary, which can occur for prolonged periods during overload conditions.

Accordingly, it would be desirable to minimize the operational losses in a superconducting winding by reducing the volume of the superconducting coil that is subject to the time varying magnetic field, and thereby subject to hysteresis losses. It would further be desirable to provide means for carrying an overload current, which is not subject to large hysteresis losses during normal operation.

SUMMARY OF THE INVENTION

Briefly, the present invention is new and improved superconductive induction apparatus in which the operating losses of a main superconducting winding are reduced by sizing the main winding to carry only the normal operating currents of the apparatus, and providing an auxiliary superconducting winding, connected in parallel with the main winding, to carry overload current. The auxiliary superconducting winding is located in a nearly field-free region of the main winding. Two nearly field-free regions exist in a transformer. When placed in a nearly field-free region, the auxiliary winding will not experience any measureable hysteresis losses in the absence of current in the auxiliary winding. This condition of zero, or near zero, current flow in the auxiliary winding, in the absence of a fault current, can be brought about in two ways. One way to prevent the flow of current in the auxiliary winding is to use a switch which is open except during the time of an overload. This can be accomplished by having the switch activated by a fault current sensing device. A second and preferred way to limit the flow of current in the auxiliary winding is to select the spacing between the layers of windings such that the auxiliary winding will present a higher impedance path than the main superconducting winding, resulting in little current flow in the auxiliary winding under normal operating conditions.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENT

Figure 1:
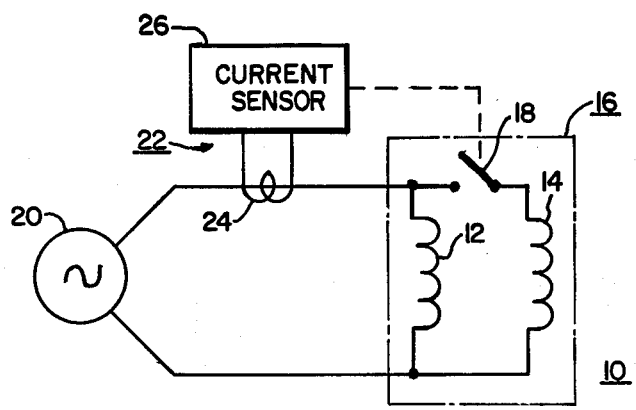
FIG. 1 is a schematic diagram of superconductive electrical inductive apparatus which may be constructed according to the teachings of the invention.

Referring now to the drawings, and to FIG. 1 in particular, there is shown superconductive electrical inductive apparatus 10 which may be constructed according to the teachings of the invention. Apparatus 10 includes main and auxiliary superconducting windings 12 and 14, respectively, which may form the primary windings of a superconducting transformer, the windings of a superconducting magnet, the windings of a superconducting reactor, etc. The broken outline 16 about windings 12 and 14 represents a tank or housing filled with a cryogenic medium, such as liquid helium.

In a first embodiment of the invention, the auxiliary superconducting winding 14 is connected in parallel with the main superconducting winding 12 via a switch, contactor, or circuit breaker 18, and the main superconducting winding 12 is connected to a source 20 of alternating potential. Current sensing means 22, such as a current transformer 24 and level detecting means shown generally at 26, is disposed to sense the current flowing in the main winding 12. The level detecting means 26, for example, may include a rectifier and an OP AMP level detector. The level detector 26 is set to provide a signal for closing switch 18 when the current magnitude reaches the critical level at which superconducting winding 12 starts to go normal.

In still another embodiment of the invention the switch 18 and current sensing means 22 are eliminated, and thus it is a preferred embodiment. In this embodiment the auxiliary winding 14 is permanently connected in parallel with the main winding 12. Substantially zero current flow through the auxiliary winding 14, during normal operation of the apparatus 10, is achieved by the placement of auxiliary winding 14 relative to the main winding 12 whereby the main winding 12 presents a lower impedance path than the auxiliary winding 14, until the main winding starts to go normal. The auxiliary winding 14 will then start to carry current due to the increasing impedance of the main winding 12. As will be hereinafter explained, it is an important aspect of the invention that the auxiliary winding 14 be located in a relatively field free region adjacent to the main winding 12.

Figure 2:
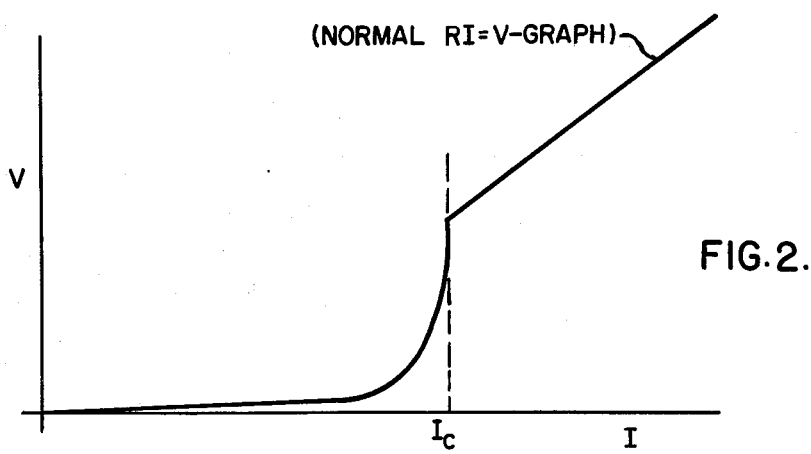
FIG. 2 is a graph illustrating voltage or electric field variation with the current density in a superconducting wire.

FIG. 2 is a graph which will aid in the understanding of the second or preferred embodiment of the invention. FIG. 2 shows the relationship between voltage, that is IR voltage, and current I for a superconducting wire. The voltage remains very close to zero, so close, in fact, that we can ignore it until the current in the superconducting wire approaches the critical value, $I_c$ wherein the resistivity of the wire begins to appreciate. It is here that the current would begin to diverge from the main winding 12 into the auxiliary winding 14 in the second embodiments, as the auxiliary winding 14 still has a resistivity near zero.

Figure 3:
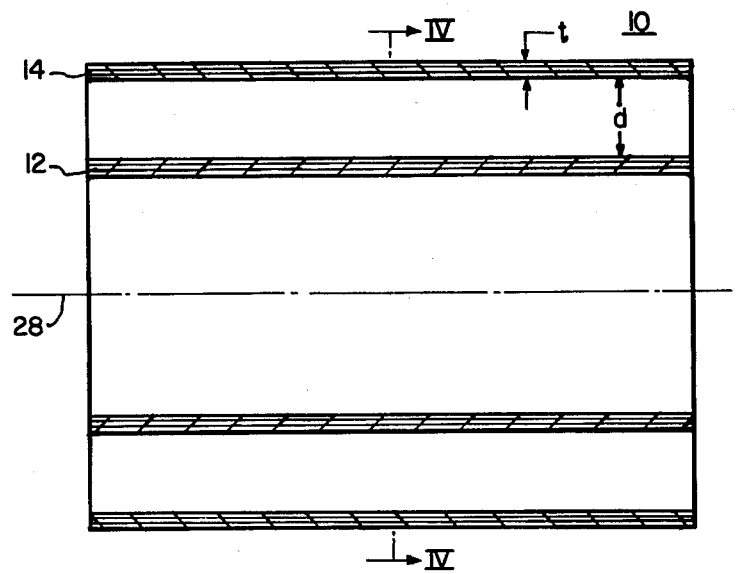
FIG. 3 is a cross-sectional view of superconducting electrical inductive apparatus constructed according to an embodiment of the invention in which an auxiliary winding is located on the periphery of a main winding.
Figure 4:
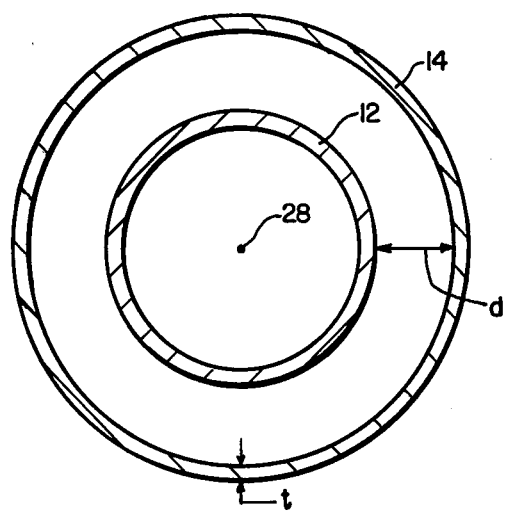
FIG. 4 is a cross-sectional view taken through plane IV—IV of FIG. 3 showing the relative locations of the coils in relationship to each other.

FIGS. 3 and 4 illustrate the superconductive electrical inductive apparatus 10 shown schematically in FIG. 1, constructed according to the invention wherein the auxiliary winding 14 is located in a substantially field-free region of the main winding 12. FIG. 3 is a cross-sectional view of apparatus 10, and FIG. 4 is a cross-sectional view of apparatus 10 shown in FIG. 3, taken between and in the direction of arrows IV—IV.

In general, FIGS. 3 and 4 illustrate an embodiment of the invention applicable to any inductive device, wherein superconducting windings or coils 12 and 14 are formed by winding superconducting wire on a coil form in a conventional fashion. Such superconducting wire may be multifilamentary, solid superconducting tape or any other superconducting wire known in the art. The windings 12 and 14 are concentric about center line 28 where a magnetic core may be located. Both windings are located in a housing of heat-insulating material which is filled with liquid helium or any other suitable cryogenic medium. Auxiliary winding 14 is distributed evenly along the periphery of the main winding 12 with a radial spacing "d" which is typically about 10 times the winding thickness "t". The auxiliary winding 14 is located in the nearly field-free region that exists along the periphery of the main winding 12, when the length of winding 12 is at least 3 times its diameter. This is substantially a field-free region because theoretically any flux generated by the current flowing in winding 12 has a large space in which to return to its opposite end. Although, practically, there is some flux in this region, whether stray or from the flux linking winding 12, it is small. Therefore, a nearly field-free region is located directly outside the periphery of winding 12. By spacing the auxiliary winding 14 so that, for example, the spacing "d" is about 10 times the thickness "t" of the windings, the thickness of the windings may be neglected and the current which flows in these windings when they are connected in parallel and wound in the same winding sense may be determined.

Consider two resistance-less concentric coils which have the same length and number of turns. If the two coils are connected in parallel and excited with AC, the voltage induced in each coil must be the same, and consequently the average flux density in the region between the inner and outer coil must vanish since this flux is linked only by the outer coil. Let the thickness of the winding be neglected. The flux between the windings contains a part $K_{22}I_2$, proportional to the current $I_2$ in the outer coil, and a part $K_{21}I_1$ proportional to the current $I_1$ in the inner coil. In general, $K_{21}$ is smaller than $K_{22}$. If, in addition, an average flux $\phi_o$, coming from external sources, exists in the space between the windings, then:

$$K_{22}I_2 + K_{21}I_1 + \phi_o = 0$$

If $\phi_o=0$, as it will be if there is no source of field other than the coils 1 and 2, it follows immediately that the ratio $I_2/I_1$ is given by $-K_{21}/K_{22}$. For a long coil (length greater than about three times the diameter), the magnitude of this ratio can be shown to be less than 1/10. Consequently, the current flows essentially in the inner coil.

So we can see that by simply arranging windings 12 and 14 in this manner, we can insure that the current will flow in the inner winding 12, which is the winding that would be sized to carry the normal operating current of the inductive apparatus. This results in a volume reduction and corresponding hysteresis loss reduction as compared with a winding which is sized to carry typical overload currents. The outer or auxiliary winding 14 will be subject to negligible hysteresis losses, since during normal operation it will carry near zero current and since it is located in the nearly field-free region shown to exist about winding 12. Now, if a current transient or a field change is introduced into the system, after the current in coil 12 reaches the critical value, the impedance of winding 12 will start to increase and the remaining current is shunted into the auxiliary winding 14.

As hereinbefore explained, the auxiliary winding 14 may also be rendered non-conducting during normal operation of the apparatus 10 by locating a switch 18 in the circuit of the auxiliary winding 14 which is nominally open, but which is controlled by a current and/or field-sensing device which will close the switch 18 upon sensing an overload.

Figure 5:
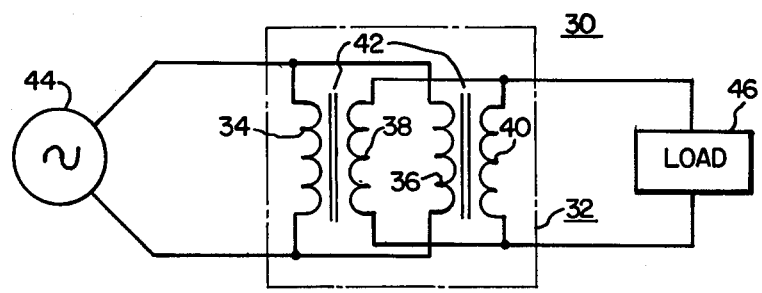
FIG. 5 is a schematic diagram of a superconductive transformer which may be constructed according to the teachings of the invention.

FIG. 5 is a schematic diagram of a superconductive transformer 30 which may be constructed according to the teachings of the invention. Transformer 30 includes a primary portion which includes a main primary winding 34 and an auxiliary primary winding 36, and a secondary portion which includes a main secondary winding 38 and an auxiliary secondary winding 40. The broken outline 32 about the windings represents a tank or housing filled with a cryogenic medium, such as liquid helium. The primary and secondary portions, which may be disposed in inductive relation with a magnetic core 42, are respectively connected to a source 44 of alternating potential, and to a load circuit 46. Transformer 30 is illustrated with direct metallic connections between the main and auxiliary primary windings 34 and 36, and with direct metallic connection between the main and auxiliary secondary windings 38 and 40, and it thus illustrates the preferred embodiment of the invention. However, switches may isolate the auxiliary windings from the main windings until an overload is detected, as hereinbefore described relative to FIG. 1.

Figure 6:
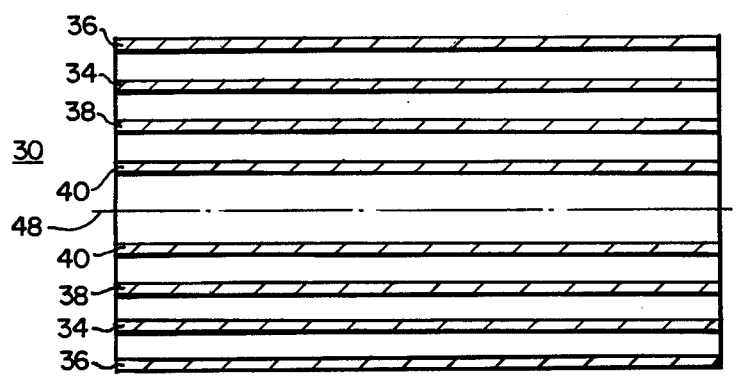
FIG. 6 is a cross-sectional view of the windings of a superconductive transformer constructed according to an embodiment of the invention in which the primary and secondary windings each have a main winding and an auxiliary winding connected in parallel therewith.

FIG. 6 illustrates the superconductive transformer 30 shown schematically in FIG. 5 constructed according to the invention wherein main primary winding 34 is connected in parallel with auxiliary primary winding 36 and main secondary winding 38 is connected in parallel with auxiliary secondary winding 40. FIG. 6 is a cross-sectional view of transformer 30, with the windings being symmetrical about longitudinal axis 48. Although FIG. 6 denotes the primary windings 34 and 36 disposed outside the secondary windings, 38 and 40, this is not essential. The windings may be reversed or stacked (i.e. a technique of transformer manufacture wherein a winding is divided into serially connected layers in order to reduce the length of the winding) as desired, as long as the main primary and secondary windings, 34 and 38, respectively are placed next to each other and the auxiliary primary and secondary windings, 36 and 40, respectively, disposed adjacent to the outer and inner peripheries of the main primary and secondary windings.

In general, the primary and secondary windings of a transformer produce equal and opposite magnetic fields. The field-free regions of concentric primary and secondary windings of a transformer are on the inside of the inner winding and on the outside of the outer winding. There is a magnetic field present between the primary and secondary windings, of approximately $H = 0.4 NI/1$ Oersteds (I in amperes, 1 in cm.). The current sharing between the outermost main winding, i.e. primary winding 34 in FIG. 6, and its auxiliary winding 36 would take place for the reasons hereinbefore set forth relative to the FIG. 1 embodiment. At first glance, it would seem the inner windings 38 and 40 would experience the same current sharing as the outer windings 34 and 36, but this does not occur. The opposite current sharing of the inner windings 38 and 40 can be understood from the following considerations.

The net flux in the space between (i.e. linking) the inner winding 38 and its auxiliary winding 40 connected in parallel must be zero. (If it were not zero, a voltage would be induced in the electrical loop formed by the two windings connected in parallel and tend to produce infinite current since the loop is a superconducting short circuit). For ideal solenoids, this will be the case if all the current flows in the main winding 38. The field inside the pair of windings 34 and 38 (the inner periphery of the main winding 38) will then be zero, because the field of winding 34 is now cancelled out by the field of winding 38. For non-ideal windings and stray fields, a small amount of current must circulate in the lower main winding 38 and its auxiliary 40 in a sense which causes the net flux linking the said two windings to be zero. This circulating current will be small compared with the net current flowing in the main winding 38 insofar as the stray field is small compared with the field between windings 38 and 34, indicating that the current flows mainly in the outer winding 38 of the two parallel windings 38 and 40.

In conclusion, the present invention discloses superconducting electrical inductive apparatus in which main windings may be sized to carry only the operational currents of the induction apparatus. Auxiliary superconducting windings may be sized to carry the transient and overload currents, connected in parallel with the main windings, and placed in field-free regions. Since these auxiliary superconducting windings are in field-free regions of the apparatus and since they are non-conducting by reason of spacing or open circuiting, they will experience low hysteresis losses until, of course, there is a current overload. This results in an overall reduction in the operational losses of the system.

It will be understood, of course, that while the transformer application herein shown and described constitutes one possible application of this invention, it is not meant to be exhaustive, and the true scope of the invention will apply to any inductive device wherein superconductors are utilized for the windings.

What I claim is:
1. Electrical induction apparatus comprising:
    at least one pair of superconducting windings, including a main winding having a plurality of turns of superconducting wire, and an auxiliary winding having a plurality of turns of superconducting wire, said superconducting wire having a portion thereof formed of superconducting materials,
    said auxiliary winding being connected in parallel with said main winding, said auxiliary winding being disposed adjacent to and concentric with the outside periphery of said main winding in the relatively field-free region that exists when said main winding is energized, said main winding being sized to carry the normal operating current of the apparatus and said auxiliary winding being sized to carry predetermined fault and overload currents in said superconducting material portion of said superconducting wire.

2. The electrical induction apparatus of claim 1 including current sensing means responsive to current flow in the main winding, and means responsive to said current sensing means for open-circuiting the auxiliary winding when current in the main winding is below a predetermined level and close circuiting the auxiliary winding when current is the main winding exceeds the predetermined level.

3. The electrical induction apparatus of claim 1 wherein the main and auxiliary windings are radially spaced such that the main winding is a lower impedance path than the auxiliary winding, resulting in little current flow in the auxiliary winding until a predetermined current is exceeded in the main winding which increases the impedance of the main winding and causes the auxiliary winding to start to carry current.

4. The electrical induction apparatus of claim 1 wherein the auxiliary winding has the same length and number of turns as the main winding.

5. A superconducting transformer comprising:

a main primary winding having a plurality of turns of superconducting wire adapted for connection to an external energizing source;

a main secondary winding having a plurality of turns of superconducting wire adapted for connection to an external load;

said main secondary winding being disposed adjacent to and concentric with the periphery of said main primary winding, such that when said main primary and main secondary windings are energized two field-free regions are created, one within the innermost winding and one external to the outermost winding;

an auxiliary primary winding having a plurality of turns of superconducting wire disposed adjacent to and concentric with the periphery of said main primary winding, within one of said field-free regions;

and an auxiliary secondary winding having a plurality of turns of superconducting wire disposed adjacent to and concentric with the periphery of said main secondary winding, within the remaining of said field-free regions;

said auxiliary primary winding being connected in parallel with said main primary winding and said auxiliary secondary winding being connected in parallel with said main secondary winding;

said superconducting wire of said main and auxiliary primary and secondary windings having a portion thereof formed of superconducting materials;

said main primary and main secondary windings being sized to carry normal operating currents of said transformer;

said auxiliary primary and secondary windings being sized to carry predetermined fault and overload currents of said transformer in said superconducting material portion of said superconducting wire.

6. The superconducting transformer of claim 5 wherein the auxiliary primary and secondary windings have a predetermined radial spacing relative to the main primary and secondary windings, respectively, selected to provide different impedance paths, such that negligible current flows in the auxiliary primary and secondary windings until a predetermined current is exceeded in the main primary and secondary windings, at which time the impedance of the main primary and secondary windings increases to cause the auxiliary primary and secondary windings to carry the excess current.

7. The superconducting transformer of claim 5 including means for sensing the magnitude of the current flowing in at least one of the main primary and main secondary windings, and means responsive to said current sensing means for open-circuiting the auxiliary primary and secondary windings when the sensed current is below a predetermined level, and for close-circuiting the auxiliary primary and secondary windings when the sensed current exceeds the predetermined level.

8. The superconducting transformer of claim 5 wherein the auxiliary primary winding has the same length and number of turns as the main primary winding, and the auxiliary secondary winding has the same length and number of turns as the main secondary winding.

* * * * *